March 16, 1954 G. GORHAM 2,672,271
CONTROL MEANS FOR AUTOMATIC FRACTION COLLECTION APPARATUS
Filed April 13, 1950
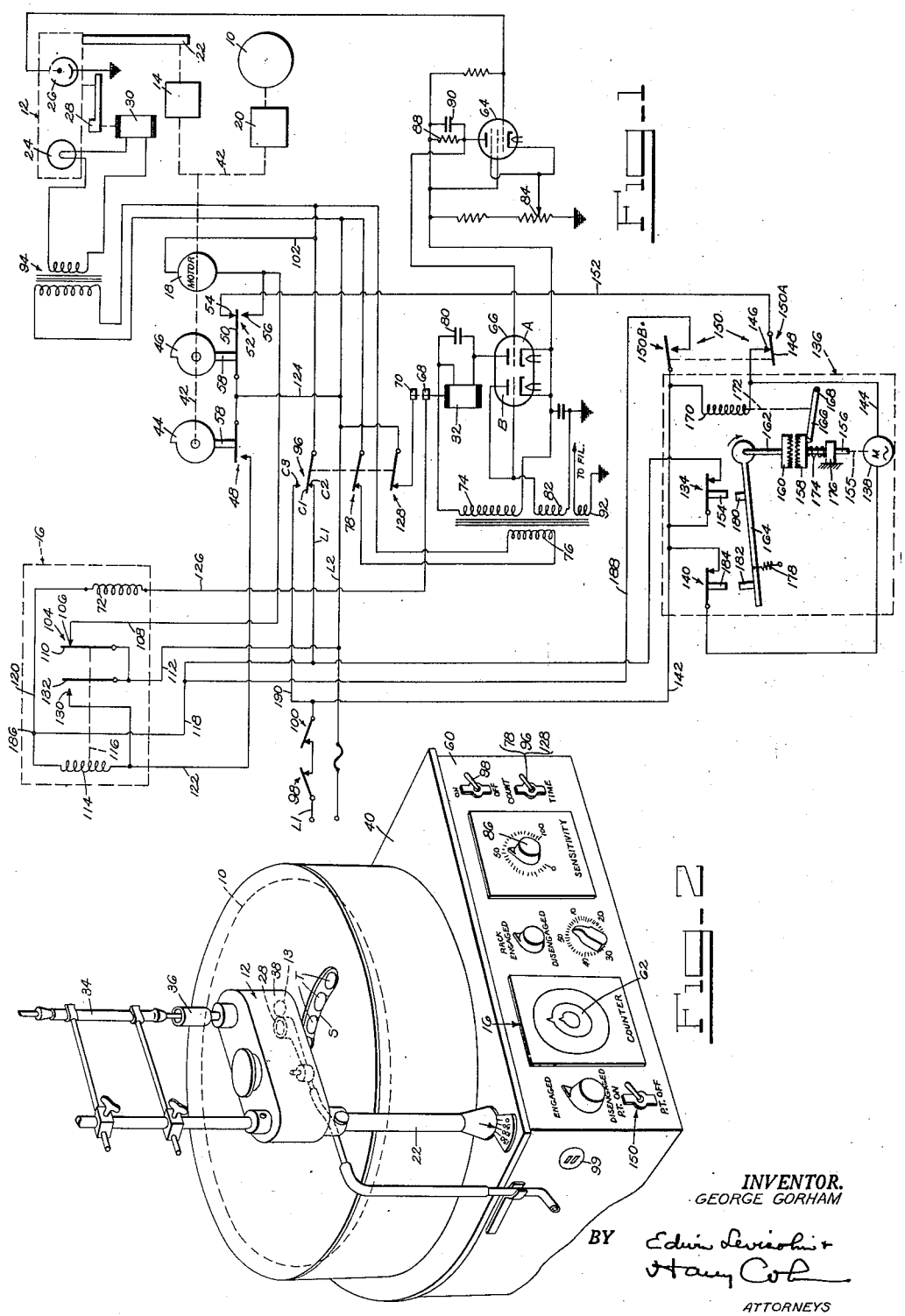
INVENTOR.
GEORGE GORHAM
BY Edwin Levisohn +
Harry Cole
ATTORNEYS Patented Mar. 16, 1954

2,672,271

UNITED STATES PATENT OFFICE 2,672,271

CONTROL MEANS FOR AUTOMATIC FRACTION COLLECTION APPARATUS

George Gorham, New York, N. Y., assignor to Technicon Chromatography Corporation, New York, N. Y., a corporation Application April 13, 1950, Serial No. 155,687

31 Claims. (Cl. 226—96)

This invention relates, in general, to an automatic fraction-collection apparatus of the type disclosed and claimed in my prior applications Serial No. 772,389, filed September 5, 1947, now Patent Number 2,604,249, and Serial No. 12,130, filed February 23, 1948, now abandoned, as well as in my application Serial No. 156,282, filed April 17, 1950, and, in particular, to control means for operating said apparatus. This application is a continuation-in-part of said prior application Serial No. 12,130.

In my application Serial No. 772,389, now Patent No. 2,604,249, I disclosed an automatic fraction-collection apparatus operable under the control of a timing device in the form of a counter which operated in response to the passage of material from a supply source through a control device, provided with a photo-electric cell, and into the receptacles carried by said apparatus. Provision was also made for preventing the flow of said material into the receptacles in the event that the exciter lamp of the photo-electric cell did not operate. In my application Serial No. 12,130, I incorporated in the apparatus disclosed in my earlier application, time-elapsed control means for interrupting the supply of the substance to the receptacles and for terminating the operation of the apparatus in the event of failure or defective operation of the control device, the counter, or of the motor utilized to intermittently rotate the receptacle carrier of said apparatus.

The primary object of the present invention is the provision of automatic fraction-collection apparatus operable, selectively, under the control of means responsive to the passage of a substance to the receptacles thereof, or under the control of time-elapsed control means.

Another object is the provision of means for utilizing the time-elapsed control means, used to interrupt the supply of the substance to the receptacles, for controlling the operation of the automatic fraction-collection apparatus in place of the control means responsive to the passage of said substance to said receptacles.

The above and other objects, features and advantages of the present invention will be more fully understood from the following description considered in connection with the accompanying illustrative drawings.

In the drawings:

Fig. 1 is a circuit diagram of the electrical and electronic devices of an automatic fraction-collection apparatus embodying the present invention, various mechanical components of the apparatus being illustrated more or less diagrammatically; and Fig. 2 is a perspective view of a portion of the apparatus.

As fully illustrated and described in my prior application Serial No. 772,389, the automatic fraction-collection apparatus comprises a movable rack 10 on which a plurality of receptacles T are arranged in each of a plurality of laterally related rows, each of which extends in the direction of movement of the rack. A control device 12, having a passage therethrough for the liquid or other substance which is to be supplied to said receptacles, is mounted for movement laterally of the receptacle-rows of the rack. The rack is moved step by step to carry each receptacle to a position at the outlet 13 of the control device for the supply of the substance to each receptacle. When the substance is to be supplied to more than one row of receptacles, the control device is moved automatically from one row to another. Indexing mechanisms, diagrammatically illustrated herein at 14, are provided for predetermining the number of receptacles which are to be supplied with the substance, and means, including a timing device or counter 16, are provided for accurately determining and measuring the quantity of substance to be supplied to each of said predetermined number of receptacles. An electric motor 18 is utilized for actuating the rack-moving mechanism, diagrammatically illustrated herein at 20, and for operating the indexing mechanisms 14, after the latter have been manually adjusted or set to determine the number of receptacles to be supplied or charged with the substance, whereby the operation of the apparatus is terminated as soon as the last receptacle is charged. Said indexing mechanisms operate a rotatable post 22 on which the control device is mounted for the automatic movement thereof. The motor is stationary during the time each receptacle is being charged and as soon as it has received its predetermined charge or quantity of the particular substance, the motor is operated, under the control of the timing device, to move the rack another step for presenting the next receptacle in position to receive its charge. The apparatus preferably includes means to interrupt the supply of the substance to any one of the receptacles in case the exciter lamp 24 for the photo-electric cell 26 of the control device 12 burns out, or is not illuminated, and also at the end of the predetermined number of rack movements as set by the indexing mechanism. For this purpose the control unit 12 is provided with a liquid intercepting device 28 carried thereby in position at the bottom thereof. Said liquid intercepting device is retained in its retracted position out of registry with the liquid outlet 13 of control device 12 during the energization of solenoid 30, said solenoid being energized during normal operation of the apparatus and before the termination thereof. However, when the solenoid is de-energized, at the end of the operation of the apparatus, or due to a defective condition of exciter lamp 24, the device 28 is moved to its projected position in registry with the outlet of control device 12 for intercepting the flow of liquid from said outlet to the receptacle T on the rack and for transmitting the intercepted liquid to a suitable collection receptacle.

In addition to the provision for interrupting the supply of liquid or other substance to the receptacles in the event that lamp 24 of the control unit 12 burns out, provision is also made, as fully illustrated and described in my prior application Serial No. 12,130, for interrupting the supply of liquid or other substance to the receptacles and to terminate the operation of the apparatus in the event of failure or defective operation of the photo-electric relay 32 or any other defect or failure resulting in the failure of the timer 16 to operate, or in the event that the motor 18 does not operate to move the rack 10 after a predetermined rest interval of said support. For this purpose there is provided a time-elapsed control device for operating a time controlled switch connected in series with the main manually operated switch of the apparatus, said time controlled switch being opened by said time-elapsed control device after an adjustable predetermined length of time exceeding the rest interval of rack 10. Upon the opening of said time-controlled switch, the previously mentioned solenoid 30 is de-energized and the liquid-intercepting device 28 is moved to its projected position to interrupt the supply of liquid to any one of the receptacles, thus preventing over-filling of such receptacle which might otherwise occur upon failure of the normal step movement of rack 10.

The apparatus, in the form described in my prior applications, was specifically designed for use as a fraction collector in chromatographic analysis. See for example, "Principles and Practice of Chromatography" by Zechmeister and Cholnoky, translated by Bachrach and Robinson, published by John Wiley & Sons, Inc., New York. In this particular use of the apparatus a liquid is passed through or in contact with an adsorbent substance of the column in a tube 34, according to known practice in the art of chromatography, and issues from the outlet of said tube drop by drop, and similarly passes, drop by drop, through the passage of the above mentioned control device 12. The photo-electric cell 26 is disposed in said control unit and is operable, in response to the intermittent interruption of light by said drops, to control the relay 32 which in turn controls the supply of electric pulses to the above mentioned counter 16 whereby to measure the quantity of liquid supplied to each of the receptacles. It will be understood that the duration of the interval between two successive movements of the rack determines the quantity of liquid supplied to each receptacle, and that this interval of rest of the rack is controlled by the counter which, as explained above, controls the operation of the motor which moves the rack. The apparatus of the present invention was designed for similar use, and will be described with reference to said use thereof, but it will be understood that it may be used for other purposes.

In the present invention, provision is made for utilizing a time-elapsed control device to interrupt the supply of liquid, or other substance, to the receptacles, in the event of faulty or defective operation of the apparatus while operating under the control of drop-counter control means, and provision is also made for alternatively operating the apparatus under time-elapsed control means, in place of said drop-counter means, said time-elapsed control means being constituted by said time-elapsed control device.

Referring now to the drawings in detail, the supply and control unit 12 is mounted on the vertical post 22 and turns with the latter about the vertical axis of said post in moving from one row of containers or receptacles T to each of said other rows. The liquid which is supplied to the receptacles issues from a suitable supply container (not illustrated) and flows through a tube 34 of the column for treatment by a substance contained therein, depending upon the process for which the apparatus is to be used. From the outlet of the tube 34 the liquid flows intermittently, i. e., drop by drop, the drops being of the same volumetric size, into the funnel 36 carried by the control unit 12. The drops of liquid pass through a liquid passage in the control unit 12 located between the photo-electric cell 26 and the companion exciter lamp 24 mounted within the casing 38 of said control unit. As each drop of liquid passes across the path of light from the lamp 24 to the photo-electric cell 26, a relay 32, subsequently described, is operable under the control of said photo-electric cell, and mechanism, including motor 18 and gearing 20, operates under the control of said relay, after the predetermined drops of liquid are supplied to the test tube at the liquid receiving station, to turn the rack 10 one step whereby to bring the next test tube into position at the liquid receiving station. More particularly, the passage of each drop of liquid between the photo-electric cell 26 and the exciter lamp 24 interrupts the light to the cell and initiates an electric impulse which is transmitted to the impulse counter mechanism 16 which is adjustable and may be pre-set so as to automatically control the intermittent movement of rack 10. Column tube 34 moves as a unit with control unit 12.

Rack 10 is turned intermittently in order to carry the liquid-receiving receptacles T successively to the liquid-receiving station S and allow sufficient time for each receptacle at said station to receive a predetermined quantity or charge of liquid. After all of the receptacles in one row are supplied with the predetermined quantities of liquid, the control unit is moved automatically to the next row. In the apparatus which has already been constructed and operated pursuant to the present invention, there is provision for 50 test tubes in each of the four rows, or a total of 200 test tubes. The apparatus may be set so as to supply a predetermined quantity of liquid to all of the 200 test tubes or to any predetermined smaller number of test tubes, according to requirements.

Rack 10 is mounted for turning movement within the housing 40. The mechanism for turning the rack comprises the reduction gearing, diagrammatically illustrated herein at 20 and fully illustrated and described in my prior application, operatively connected to a shaft, illustrated diagrammatically at 42, actuated by an electric motor 18. Switch-operating mechanism, here shown as cams 44 and 46, are fixed to and rotated by shaft 42 for momentarily closing the normally open switch 48 and for operating the movable contact 50 of switch 52 to move the latter out of normal engagement with the fixed contact 54 thereof and into engagement with the fixed contact 56 thereof which is connected to motor 18. Said switches are preferably of the micro-switch type, but may be of any other type, and each includes a pin 58 which is engaged by the cams 44 and 46, respectively, for momentarily operating said switches, as described. These switches cooperate with other devices hereinafter described for controlling the operation of motor 18. The arrangement and relation between the parts of the motor-operated mechanism is such that shaft 42 makes only one revolution during each operation of the motor under the control of switches 48 and 52 and the associated control devices hereinafter to be described in detail. It will be understood that the operation of motor 18 is such as to operate gearing 20 to turn the rack precisely the angular distance required to bring the liquid-receiving receptacles T in succession, in each row, to the liquid-receiving station S at which control unit 12 is positioned, so that during the successive movements of the rack all of the liquid-receiving receptacles of each row are presented at the liquid-receiving station, in succession, and are there held for a sufficient length of time to receive therein a predetermined, measured quantity of liquid.

It is apparent from the above description that when the rate of flow of liquid through the control unit is adjusted so that said rate of flow is uniformly constant, the quantity of liquid which is supplied to each receptacle is determined by the length of time during which that particular receptacle is held stationary in position under the liquid outlet of the control unit and this length of time is the same as the duration of the period during which the rack is stationary, that is, the length of time between two successive operations of motor 18. This length of time may be predetermined by any suitable timing device but in the present instance, in view of the drop-by-drop supply of liquid, a timing device of the type which operates as a drop counter is utilized. This timing device, indicated at 16, is mounted on control panel 60 and has a suitably calibrated dial and a time-adjusting knob 62. The timing device or counter may be of any suitable type, and since it is not in itself part of the present invention it is not herein described specifically, but certain parts thereof are hereinafter referred to in explaining the operation of the apparatus. The counter or timing device utilized in the apparatus as actually constructed and operated is an instantaneous reset counter of the type described in U. S. Patent No. 2,329,447 and was supplied by Eagle Signal Corporation, Moline, Illinois. When a start switch, in this case switch 98, is closed, a clutch coil, i. e., a coil of an electro-magnetically operated clutch, is engaged and impulses transmitted to a count or ratchet-operating coil of an electro-magnet are effective to operate the ratchet, and when the clutch coil is de-energized, the counter is automatically reset to its starting position. The count coil and the ratchet operated thereby take the place of the synchronous or clock motor 22 of said patent for operating the timer shaft 25 of said patent, and the switch connections in the circuit are modified as required, as will be readily apparent. The clutch coil and count coil and the switching connections are schematically shown in Fig. 1 and will be presently more particularly referred to in the description of the operation of the apparatus.

As shown in Fig. 1, the photo-electric cell 26 of control unit 12 is connected to the electronic tube 64, which, as here shown, is a 6SJ7 tube, in an electronic-relay circuit. This tube is biased so that it is normally non-conducting but becomes conducting under the control of photo-electric cell 26 each time a drop of liquid passes between said cell and the exciter lamp 24 and cuts off the light from said lamp to said cell. An electronic tube 66, here shown as a 6SN7 tube, has an electronic discharge system therein connected to the winding of magnetic relay 32 and is operable under the control of tube 64. The section of tube 66 which is connected to relay 32 and tube 64 is indicated at A. This section is normally conducting and energizes the winding of relay 32 so that the contacts 68 and 70 of said relay are normally open. When a pulse is received by tube 64, section A of tube 66 becomes non-conducting and as a result the winding of relay 32 is de-energized and contacts 68 and 70 of said relay close so that a pulse is sent to the count or ratchet-operating coil 72 of the timing device 16. Power for the relay circuit is provided by the transformer secondary winding 74, the primary winding 76 of said transformer being connected to the supply lines L1 and L2 which receive alternating current from a suitable source, a switch 78 being in one of the leads from the supply lines to said primary winding. Tube 66 conducts current only during the positive half of the alternating current cycle, so that a pulsating current flows through the relay circuit. Accordingly a condenser 80 is provided to smooth the voltage across the winding of relay 32 so as to prevent it from following the frequency of the current through the tube. The section B of tube 66 constitutes a half wave rectifier for the current supplied by the transformer secondary winding 82. The sensitivity control provided by the adjustable resistance 84 is adjusted, by the knob 86 on control panel 60, so that the effect of the light from lamp 24 on photo-electric cell 26 causes the grid of tube 64 to be negative with respect to the cathode, whereby plate current through said tube is cut off as a result of this negative bias. The grid-cathode of section A of tube 66 is connected across the resistor 88 in the plate circuit of tube 64. The voltage drop across this resistor acts as a bias voltage to the grid of section A of tube 66, but since voltage across this resistor is normally zero the flow of plate current in section A of tube 66 takes place so that the winding of relay 32 is normally energized as hereinbefore indicated. When light on the photo-electric cell 26 is interrupted, upon the passage of a drop of liquid across the light beam from lamp 24 to said photo-electric cell, the negative bias on the grid of the tube 64 is decreased and the plate circuit of said tube conducts current whereby the voltage drop across resistance 88 produces a negative bias across the grid-cathode of section A of tube 66, interrupting the flow of current in the plate circuit of said tube and thus de-energizing relay 32 so that contacts 68, 70 close and complete a circuit through the count or ratchet operating coil 72 as hereinbefore stated. The condenser 90 across resistance 88 charges when tube 64 conducts current, and after said tube is cut off the charge across condenser 90 leaks off across resistor 88 and thereby maintains the grid of section A of tube 66 negatively biased and the circuit of the winding of relay 32 de-energized for a short period of time after light is restored to the photo-electric cell 26. This circuit provides a quick charge path and a slow discharge path for the condenser 90 and in this way a light interruption of short duration, when a drop of liquid passes between the photo-electric cell and the exciter lamp 24, is in effect prolonged for a sufficient length of time to enable the relay 32 to operate. The transformer secondary 92 provides a source of current for heating the filaments of tubes 64 and 66.

A step-down transformer 94 connected to supply lines L1 and L2 is provided for energizing the exciter lamp 24 and the winding of solenoid 30 which normally holds the liquid intercepting device 28 in its retracted position as described above.

Supply lines L1 and L2, the former having switch 96 therein, are connected to a suitable source of 60-cycle alternating current through the main manually operable switch 98 which is mounted on the control panel 60. Said control panel is also provided with an electric receptacle or plug-in socket 99 to receive a plug terminal for supplying the operating current to the apparatus through said switch 98. The switch 100 which is normally closed but which is opened when post 22 turns to its end position at the completion of the operation of the apparatus, is also shown in Fig. 1.

Motor 18 is connected directly to line L1 by wire 102 and to line L2 through the switch 104 of the timing device or counter 16. Switch 104 has a stationary contact 106 which is connected to the motor by wire 108, and a companion movable contact 110 which is connected to line L2 by wire 112. Contact 110 is engaged with the companion contact 106 of switch 104 when the solenoid or clutch coil 114 of the timing device 16 is de-energized, and conversely, when said clutch coil is energized, the armature 116, which is then attracted by said clutch coil, is operable to disengage contact 110 from contact 106 for opening switch 104, thus interrupting the supply of current to motor 18. It will be noted that line L1 is connected to one terminal of clutch coil 114 by wire 118 and to one terminal of the count or ratchet-operating coil 72 by wire 118 and by wire 120. The other terminal of the clutch coil is connected to line L2 by wire 122 through switch 48, said switch and the companion switch 52 being connected to line L2 by the wire 124. The other terminal of the count or ratchet operating coil 72 is connected to the contact 68 of relay 32 by wire 126, and, as pointed out above, when contact 68 is engaged with contact 70 said other end of coil 72 is connected to line L2 for energizing said coil, switch 128 between contact 70 and line L2 being closed.

The timing device 16 includes a stationary contact 130 and a companion movable contact 132. These contacts are open when the clutch coil is de-energized and are closed when said clutch coil is energized, contact 132 being then moved to engage contact 130 by armature 116 of said clutch coil 114. It will be noted that contact 130 is connected to one terminal of the clutch coil and that movable contact 132 is connected to line L2 by wire 112 to complete a holding circuit for said clutch coil.

The provision for interrupting the supply of liquid or other substance to the receptacles and to terminate the operation of the apparatus, in the event of failure or defective operation of the photo-electric relay or any other defect or failure resulting in the failure of the timer 16 to operate, or in the event that the motor 18 does not operate to move the receptacle-support 10 after a predetermined rest interval of said support, includes time controlled switch 134, which is preferably constituted by the separable contacts of a time-delay relay mechanism 136, provided in the circuit of supply lines L1, L2. Switch 134 is normally closed but is opened by the timer of said relay after an adjustable predetermined length of time exceeding the rest interval of receptacle support 10. It will be understood that when switch 134 is opened the circuit through solenoid 30 is interrupted and as a result the liquid-intercepting device 28 is moved to its projected position, as described above, whereby to interrupt the supply of liquid to any one of the receptacles, thus preventing over-filling of such receptacle which might otherwise occur upon failure of the normal step movement of rack 10. The time-control means of the relay for opening switch 134 includes a self-starting synchronous motor 138, one terminal of which is connected through the normally closed contacts of override switch 140 to line L1 by wire 142 and the other terminal of which is connected by wire 144 to line L2 through the engaged contacts 146 and 148 of section 150A of the double-pole-double-throw switch 150, mounted on control panel 60, the wire 152 connected to contact 54 of switch 52 and through the latter switch, which is normally closed at contact 54, to wire 124 connected to line L2. Accordingly, it will be understood that if the movable contact member 50 of switch 52 is not disengaged from the timer contact 54 at intervals corresponding to the normal operation of cam 46, timer motor 138 being energized, and if it continues to operate for a sufficient length of time predetermined according to the adjustment of the timer which includes said motor 138, switch operating member 154 operates to open switch 134 and thereby interrupts the power circuit and also, as a result of the interruption of the circuit, cuts off the supply of liquid to the receptacles on support 10 and interrupts the operation of the apparatus. The operation of the timer which includes the motor 138 and the switch 134 will be more clearly understood from the following description with reference to Fig. 1.

As shown more or less diagrammatically at 155, motor 138 operates a shaft 156 at a slow uniform speed. Said shaft carries or drives a clutch member 158 which is arranged to releasably engage a companion clutch member 160 which is carried by or drives the rotary shaft 162 on which there is provided the member 164 which is rotatable by said rotary shaft to actuate the switch operating member 154 when motor 138 is energized and clutch members 158 and 160 are in engagement with each other. Clutch member 158 is mounted for movement longitudinally of shaft 156 and is movable by a clutch-operating lever 166. Said lever is pivoted at 168 and is operable under the control of electromagnet 170 of the time-delay relay, the coil of which is in parallel circuit connection with relay motor 138, the armature 172 of said magnet being attached to lever 166 for moving the latter when the coil is energized. When magnet 170 is de-energized, spring 174, which is mounted about shaft 156 and connected between clutch member 158 and the stationary member 176, through which shaft 156 is slidably movable, retracts clutch member 158 from the driven clutch member 160, and when this occurs the timer 136 is automatically re-set, i. e., actuating member 164 is returned to its original position by spring 178. Member 164 is provided with part 180 which engages member 154 to open switch 134 when motor 138 has operated for the preset time thereof. Member 164 is also provided with part 182 which engages actuating member 184 of over-ride switch 140, after switch 134 opens, to open the motor circuit for preventing over-travel of member 164, it being noted that motor 138 is connected by wire 142 to line L1 at a point between the power input and switch 134 whereby the opening of the latter switch does not open the motor circuit.

Therefore, it will be understood that if cam 46 fails to disengage contact 50 of switch 52 from contact 54 thereof, at intervals corresponding to the normal operation of cam 46, motor 138 being energized for its preset time, switch 134 is opened by member 164 to open the power circuit of the apparatus and switch 140 is then opened to prevent the continued movement of member 164. It will be noted that with both of said switches open, coil 170 is still energized, one end being connected to line L1 through wire 142 which connects to the line before the break at switch 134, and the other end being connected through the engaged contacts 54 and 50 of switch 52 to line L2 whereby, despite the de-energization of motor 138 by the opening of the motor circuit at switch 140, clutch member 158 remains in engagement with driven clutch member 160 to retain switch 134 in open condition to prevent the operation of the apparatus, the member 28 being positioned to receive fluid issuing from control device 12, as previously described.

It will be understood that any other suitable device may be used in place of the over-ride switch 140 to achieve the same result. For example, said switch may be replaced by a slip clutch mechanism, well known in the art, to prevent motor 138 from operating after switch 134 is opened to prevent continued movement of member 164.

If desired, for example, where an operator is in attendance, the apparatus may be operated under the control of control device 12 and counter 16 without the use of the time-delay mechanism 136 as a protective device. In this connection, the double-pole-double-throw protective timer "on-off" switch 150, comprising the switch sections 150A and 150B, is thrown from its "on" position, illustrated in Fig. 1, in which position section 150A is closed and section 150B is open, to its "off" position, in which section 150A is open, thereby interrupting the circuit between contact 54 of switch 52 and both the motor 138 and the coil 170 of mechanism 136, and switch 150B is closed whereby point 186 of counter 16 is connected to line L1, at a point thereon between switch 134 and the power input source, through wire 188, closed switch 150B and wire 142 to by-pass the connection of said point 186 to line L1 through wire 118 and also by-passing switch 134 in said line.

When it is desired to operate the apparatus under direct time, or time-elapsed, control rather than under drop-counter control, so that rack 10 will turn after each receptacle has remained in the material receiving station for a predetermined time to receive a charge measured by the rest intervals of rack 10, rather than to receive a charge the drops of which have been counted, mechanism 136 is used as a time-elapsed control device. Ganged switches 128, 78, and 96 are moved from their "count" position shown in Fig. 1, to "time" position in which the circuit between contact 70 of relay 32 and power line L2 is opened at switch 128, the circuit of primary 76 is opened at switch 78 to remove operating voltages from tubes 64 and 66, and the movable contact C1 of switch 96 disengages stationary contact C2 and engages stationary contact C3 which is connected by wire 190 to line L1 at a point between switches 98 and 134 to by-pass the latter. It will be noted that the primary winding of transformer 84 remains in the circuit for controlling solenoid 30 which operates device 28.

With switch 150 in its "on" position, as illustrated in Fig. 1, and with switches 128, 78 and 96 in "time" position, the apparatus operates as follows:

One side of rack-drive motor 18 is connected to line L1 between switches 98 and 134 by wire 102, engaged contacts C1—C3 of switch 96 and wire 190, the other side of the motor being connected to line L2 by wire 108 and normally closed switch 104 of timer 16. When switch 98 is closed, motor 18 operates to turn shaft 42. When shaft 42 has turned a short distance, start switch 48 is closed momentarily by cam 44 and completes the circuit through the clutch coil 114 so that said coil is energized and opens the switch 104, at the same time closing the contacts 130 and 132 providing a holding circuit for the clutch coil 114 independently of switch 48. Although switch 104 is opened when clutch coil 114 is thus energized, the motor continues to operate for a short time, since the circuit therethrough is held closed momentarily at the switch 52, cam 46 closing contacts 50 and 56 thereof which are set to engage shortly before switch 48 is actuated by cam 44 and then to disengage a moment later, allowing one revolution of shaft 42 to take place. Motor 18 then stops and remains stationary under the control of timer 136. When the motor stops, contacts 50 and 54 of switch 52 are engaged to energize motor 138 of timer 136, one end thereof being connected to line L1 by wire 142, and the other end being connected to line L2 by wire 144, switch 150A, wire 152, switch 52 and wire 124. Motor 138 being operative, and clutch coil 170 being in parallel therewith for concomitant energization, timer 136 operates according to the setting thereof to open switch 134 at the end of the set time interval, thereby opening the circuit between point 186 of timer 16 and the power source to de-energize clutch coil 114, to open engaged contacts 130 and 132 and to close switch 104, said timer being automatically reset for the next operation. Upon the closing of switch 104, motor 18 begins to operate, it being noted that its connection through wire 102 to the power source by-passes open switch 134 through contacts C1—C3 of switch 96 and wire 190. The energization of motor 18 rotates shaft 42 to operate cams 44 and 46, the latter momentarily operating switch 52 to engage the contacts 50 and 56, thereof. As stated above, cam 46 is set to operate switch 52 shortly before switch 48 is actuated by cam 44 and then to open contacts 50 and 56 a moment later. When cam 46 operates, as described, the circuit of motor 138 is broken at contact 54 to reset timer 136, and to close switch 134, as described. It will be understood that switch 134 closes before cam 44 operates switch 48 so that the circuit of clutch coil 114 between point 186 and the power source is completed, whereby, when cam 44 operates switch 48, the clutch coil 114 is energized to engage contacts 130 and 132 to form a holding circuit and to open switch 104 in the circuit of motor 18, the cycle then being repeated, as described. Therefore, it will be apparent that the rest period of motor 18 is determined by the setting of timer 136 and that the periodic operation of switch 52 by cam 46 interrupts the motor of timer 136 to reset the latter. It will be understood that the over-ride switch does not operate when timer 136 controls the operation of the apparatus. Motor 18 begins to operate immediately upon the opening of switch 134 and very shortly thereafter cam 46 operates to de-energize motor 138 before the over-travel of member 164. After all the receptacles have been filled and switch 100 is opened, as described, solenoid 30 is de-energized to operate device 28 for interrupting the supply of liquid to the receptacles, it being noted that the periodic opening of switch 134 has no effect upon the solenoid since the circuit of primary 94 includes wire 199 which by-passes said switch.

It will be observed that the apparatus of the present invention is operable to supply an accurately measured quantity of liquid, under the selective control of a drop-counter or a time-elapsed counter, to each of a predetermined large number of receptacles, without requiring the attention or presence of an attendant. Thus, for example, once the operation of the apparatus has been initiated, it may be left operating, overnight if necessary, until all of the selected number of receptacles are supplied with liquid, at which time the operation is automatically terminated.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-control means and material-count control means for determining the rest period of said container-supporting means between the intermittent movements thereof, and means for selectively placing said motor under the control of either one of said control means whereby said motor is de-energized for a rest period determined by the selected one of said control means.

2. Apparatus of the character described, comprising material-discharge outlet means, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, and means for selectively placing said motor under the control of either one of said control means whereby said motor is de-energized for a rest period determined by the selected one of said control means.

3. Apparatus of the character described, comprising material-discharge outlet means, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, means for selectively placing said motor under the control of either of said control means whereby said motor is de-energized for a rest period determined by the selected one of said control means, and means automatically operable during the control of said motor by said material-count means to interrupt the supply of material to any one of said receptacles after the receptacle is at said position for a predetermined length of time.

4. Apparatus of the character described, comprising material-discharge outlet means, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, means for selectively placing said motor under the control of either one of said control means whereby said motor is de-energized for a rest period determined by the selected one of said control means, and means automatically operable during the control of said motor by said material-count means to interrupt the supply of material to any one of said receptacles after the receptacle is at said position for a predetermined length of time, said automatically operable means being operated by said time-elapsed control means after a time interval longer than the rest period determined by said material-count means in the normal operation of the latter.

5. Apparatus of the character described, comprising material-discharge outlet means, container-supporting means mounted for movement in relation to said outlet means and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, means for selectively placing said motor under the control of either one of said control means whereby said motor is de-energized for a rest period determined by the selected one of said control means, and means automatically operable during the control of said motor by said material-count means to interrupt the supply of material to any one of said receptacles after the receptacle is at said position for a predetermined length of time, said automatically operable means being operated by said time-elapsed control means after a time interval longer than the rest period determined by said material-count means in the normal operation of the latter, said selector means being operable also for selectively placing said automatically operable means under the control of said time-elapsed control means.

6. Apparatus of the character described, comprising material-discharge outlet means, container-supporting means mounted for movement in relation to said outlet means and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, means for selectively placing said motor under the control of either one of said control means whereby said motor is de-energized for a rest period determined by the selected one of said control means, means movable from a retracted position to a projected position for intercepting the substance normally passing from said outlet to said containers, and means operable in response to a predetermined number of movements of said container-supporting means to move said substance-intercepting means from said retracted position thereof to said projected position.

7. Apparatus of the character described, comprising material-discharge outlet means, container-supporting means mounted for movement in relation to said outlet means and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, means for selectively placing said motor under the control of either one of said control means whereby said motor is de-energized for a rest period determined by the selected one of said control means, and means operable pursuant to a predetermined number of movements of said carrier means to terminate the operations of said motor.

8. Apparatus of the character described, comprising material-discharge outlet means, container-supporting means mounted for movement in relation to said outlet means and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-elapsed control means and material-count control means for determining the rest period of said container-supporting means between the intermittent movements thereof, means for selectively placing said motor under the control of either one of said control means whereby said motor is de-energized for a rest period determined by the selected one of said control means, means operable pursuant to a predetermined number of movements of said carrier means to terminate the operations of said motor, means movable from a retracted position to a projected position for intercepting the substance normally passing from said outlet to said containers, and means operable in response to said predetermined number of movements of said container-supporting means to move said substance-intercepting means from said retracted position thereof to said projected position.

9. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, means operatively connected to said moving means to predetermine the number of step by step movements of said carrier means, timing means for controlling the operations of said motor whereby to predetermine the duration of rest intervals of said carrier means between the successive step movements thereof, means automatically operable to interrupt the supply of material from said supply-device to the receptacle while the latter is at said station, timing means for controlling the operation of said interrupting means, said last mentioned timing means having an operating cycle which is longer than the rest interval of said carrier means, and means to initiate said operating cycle at the start of the rest interval whereby said last mentioned timing means is effective to operate said interrupting means only after a predetermined interval of time which is longer than the rest interval determined by said first mentioned timing means in the normal operation of the latter.

10. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, and means operable under the control of said first mentioned moving means to actuate said last mentioned moving means for moving said control device to said other position thereof after a predetermined number of movements of said container-supporting means and means automatically operable to interrupt the supply of material to any one of said receptacles, and timing means for controlling the operation of said interrupting means, said timing means operating said interrupting means after the receptacle is at said position for a predetermined length of time.

11. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container-supporting means, substance-receiving means movable from a retracted position to a projected position for intercepting the substance normally passing from said outlet to said containers, time-controlled means and means automatically operable in response to said time-controlled means to move said substance-receiving means from said retracted position thereof to said projected position, said automatically operable means being also operable in response to a predetermined number of movements of said container-supporting means to move said substance-receiving means from said retracted position thereof to said projected position.

12. Apparatus of the character described, comprising movable means for supporting a plurality of receptacles in a row extending in the direction of movement of the supporting means, means for mounting a material-supply device in position at a receptacle-charging station, means for moving said supporting means step by step to carry said receptacles in succession to said station to receive a charge of material from said supply device, a motor for actuating said moving means, means operatively connected to said moving means to predetermine the number of step-by-step movements of said supporting means, timing means for controlling the operations of said motor whereby to predetermine the duration of rest intervals of said supporting means between the successive step movements thereof, means for interrupting the passage of material to the receptacles, means for actuating said last mentioned means, a timer motor operable under the control of the operations of said first-mentioned motor, and switching means operable under the control of said timer motor for controlling the operation of said last-mentioned actuating means.

13. Apparatus of the character described, comprising movable means for supporting a plurality of receptacles in a row extending in the direction of movement of the supporting means, means for mounting a material-supply device in position at a receptacle-charging station, means for moving said supporting means step by step to carry said receptacles in succession to said station to receive a charge of material from said supply device, a motor for actuating said moving means, means operatively connected to said moving means to predetermine the number of step-by-step movements of said supporting means, timing means for controlling the operations of said motor whereby to predetermine the duration of rest intervals of said supporting means between the successive step movements thereof, means for interrupting the passage of material to the receptacles, means for actuating said last mentioned means, a timer motor operable under the control of the operations of said first-mentioned motor, and switching means operable under the control of said timer motor for controlling the operation of said last-mentioned actuating means and for interrupting the first motor circuit after a predetermined interval of time which is longer than the rest interval determined by said first-mentioned timing means in the normal operation thereof.

14. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, means operatively connected to said moving means to predetermine the number of step by step movements of said carrier means, time-elapsed means for controlling the operations of said motor whereby to predetermine the duration of rest intervals of said carrier means between successive step movements thereof, means movable from a retracted position to a projected position for intercepting the substance normally passing from said device to said containers, and means operable in response to a predetermined number of movements of said container-supporting means to move said substance-intercepting means from said retracted position thereof to said projected position.

15. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, means operatively connected to said moving means to predetermine the number of step by step movements of said carrier means, time-elapsed means for controlling the operation of said motor whereby to predetermine the duration of rest intervals of said carrier means between successive step movements thereof, means operable pursuant to a predetermined number of step movements of said carrier means to terminate the operations of said motor, means movable from a retracted position to a projected position for intercepting the substance normally passing from said device to said containers, and means operable in response to said predetermined number of movements of said container-supporting means to move said substance-intercepting means from said retracted position thereof to said projected position.

16. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, timing means for controlling the operations of said motor whereby to predetermine the duration of rest intervals of said carrier means between successive step movements thereof, and time-controlled means including means automatically operable to interrupt the supply of material from said supply-device to the receptacle in position at said station, and means to operate said time-controlled means only after a predetermined interval of time which is longer than the rest interval determined by said timing means in the normal operation of the latter.

17. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, timing means for controlling the operations of said motor whereby to predetermine the duration of rest intervals of said carrier means between successive step movements thereof, time-controlled means including means automatically operable to interrupt the supply of material from said supply-device to the receptacle in position at said station, and means to operate said time-controlled means only after a predetermined interval of time which is longer than the rest interval determined by said timing means in the normal operation of the latter, and switching means for selectively energizing said time-controlled means whereby said apparatus is operable under the control of said timing means with or without said time-controlled means for interrupting the supply of material to the receptacle.

18. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, timing means including control means responsive to the passage of material from said device, counter means operable by said control means and a plurality of switches plus a counter switch for controlling the motor circuit whereby to control the operations of said motor to predetermine the duration of rest intervals of said supporting means between the successive step movements thereof, a timer motor operable under the control of said plurality of switches, switching means operable under the control of said timer motor for interrupting one side of said first motor circuit and for de-energizing said counter to complete the other side of said first motor circuit through said counter switch after a predetermined interval of time which is longer than the rest interval determined by said first mentioned timing means in the normal operation thereof, and selectively operable means for de-energizing said first mentioned control means and for by-passing said switching means for removing the latter from said first motor circuit whereby, the time interval, after which said timer motor operates said switching means to de-energize said counter to complete said first motor circuit, will determine the duration of said rest intervals.

19. Apparatus of the character described, comprising movable carrier means for supporting a plurality of receptacles in a row extending in the direction of movement of the carrier means, means for mounting a material-supply device in position at a receptacle-charging station, means including a motor for moving said carrier means step by step to carry said receptacles in succession to said station to receive a charge of material from said supply device, means operatively connected to said moving means to predetermined the number of step by step movements of said carrier means, timing means for controlling the operations of said motor whereby to predetermine the duration of rest intervals of said carrier means between the successive step movements thereof, means automatically operable to interrupt the supply of material from said supply-device to the receptacle while the latter is at said station, timing means for controlling the operation of said interrupting means, said last mentioned timing means operating said interrupting means only after a predetermined interval of time which is longer than the rest interval determined by said first mentioned timing means in the normal operation of the latter, and means operable pursuant to a predetermined number of step movements of said carrier means to terminate the operations of said motor.

20. Apparatus of the character described, comprising movable carrier means for supporting a plurality of receptacles in a row extending in the direction of movement of the carrier means, means for mounting a material-supply device in position at a receptacle-charging station, means for moving said carrier means step by step to carry said receptacles in succession to said station to receive a charge of material from said supply device, means including a motor operatively connected to said moving means to predetermine the number of step-by-step movements of said carrier means, switching means for controlling the circuit of said motor, timing means operable in conjunction with said switching means for controlling the operations of said motor whereby to predetermine the duration of rest intervals of said carrier means between the successive step movements thereof, means automatically operable to interrupt the supply of material from said supply-device to the receptacle while the latter is at said station, and timing means for controlling the operation of said interrupting means, said last-mentioned timing means being operable under the control of said switching means after a predetermined interval of time which is longer than the rest interval determined by said first mentioned timing means in the normal operation of the latter.

21. Apparatus of the character described, comprising a movable device having a material supply passage, carrier means for supporting a plurality of receptacles in a plurality of laterally related rows, means for moving said carrier means in relation to the outlet of said passage for presenting the receptacles in succession at a position to be supplied with material issuing from said outlet, means operable automatically in response to a predetermined movement of said carrier means for moving said movable device laterally of said receptacle rows, whereby to position said device in material-supplying relation to the receptacles of one of said rows following the supply of material to the receptacles of another of said rows, means automatically operable to interrupt the supply of material to any one of said receptacles, and timing means for controlling the operation of said interrupting means, said timing means operating said interrupting means after the receptacle is at said position for a predetermined length of time.

22. Apparatus of the character described, comprising a movable device having a material supply passage, carrier means for supporting a plurality of receptacles in a plurality of laterally related rows, means for moving said carrier means in relation to the outlet of said passage for presenting the receptacles in succession at a position to be supplied with material issuing from said outlet, means operable automatically in response to a predetermined movement of said carrier means for moving said movable device laterally of said receptacle rows, whereby to position said device in material-supplying relation to the receptacles of one of said rows following the supply of material to the receptacles of another of said rows, indexing means associated with said first mentioned moving means and with said other moving means for predetermined the extent of movement of said carrier means required before said other moving means is actuated, means automatically operable to interrupt the supply of materials to any one of said receptacles, and timing means for controlling the operation of said interrupting means, said timing means operating said interrupting means after the receptacle is at said position for a predetermined length of time.

23. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container-supporting means, means operable in response to a predetermined number of movements of said container-supporting means to discontinue the operation of said moving means therefor, means automatically operable to interrupt the supply of material to any one of said receptacles, and timing means for controlling the operation of said interrupting means, said timing means operating said interrupting means after the receptacle is at said position for a predetermined length of time.

24. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container-supporting means, substance-receiving means movable from a retracted position to a projected position for intercepting the substance normally passing from said outlet to said containers, time-controlled means, means operable in response to said time-controlled means to move said substance-receiving means from said retracted position thereof to said projected position.

25. Apparatus of the character described comprising a control device carrying a lamp, a companion photo-electric cell, and a vertical passage across the path of light from said lamp to said cell, container-supporting means mounted for movement in relation to the outlet of said passage and constructed and arranged to carry a plurality of containers in a row extending in the direction of movement of the container-supporting means, a relay operable under the control of said cell, means including a motor operable under the control of said relay in response to the passage of a substance through said passage for moving said container-supporting means intermittently to present said containers in succession in position to receive a quantity of substance from said outlet, means movable from a retracted position to a projected position for intercepting the substance normally passing from said outlet to said containers, means for actuating said intercepting means, means operable in response to a predetermined number of movements of said container-supporting means to move said substance-intercepting means from said retracted position thereof to said projected position, means operable in response to a predetermined number of movements of said container-supporting means to discontinue the operation of said moving means therefor, and means including a switch in circuit with said actuating means and with said motor, and a timer for actuating said switch to interrupt the motor circuit and to operate said actuating means to cause said substance-intercepting means to move to said projected position thereof when the rest interval of any one of said containers at said substance-receiving position thereof exceeds a predetermined length of time.

26. Apparatus of the character described, comprising movable carrier means for supporting a plurality of receptacles in a row extending in the direction of movement of the carrier means, means for mounting a material-supply device in position at a receptacle-charging station, means for moving said carrier means step by step to carry said receptacles in succession to said station to receive a charge of material from said supply device, a motor for actuating said moving means, means operatively connected to said moving means to predetermine the number of step-by-step movements of said supporting means, timing means for controlling the operations of said motor whereby to predetermine the duration of rest intervals of said supporting means between the successive step movement thereof, means for interrupting the passage of material to the receptacle, means for actuating said last mentioned means, and time-controlled switching means for controlling the operation of said last mentioned actuating means.

27. Apparatus of the character described, comprising movable means for supporting a plurality of receptacles in a row extending in the direction of movement of the supporting means, means for mounting a material-supply device in position at a receptacle-charging station, means for moving said supporting means step by step to carry said receptacles in succession to said station to receive a charge of material from said supply device, a motor for actuating said moving means, means operatively connected to said moving means to predetermine the number of step-by-step movements of said supporting means, timing means including a plurality of switches for controlling the motor circuit whereby to control the operations of said motor to predetermine the duration of rest intervals of said supporting means between the successive step movements thereof, means for interrupting the passage of material to the receptacle, means for actuating said last-mentioned means, a timer motor operable under the control of one of said switches, and switching means operable under the control of said timer motor for controlling the operation of said last-mentioned actuating means whereby to interrupt the passage of material to the receptacle after a predetermined interval of time which is longer than the rest interval determined by said first-mentioned timing means in the normal operation thereof.

28. Apparatus of the character described, comprising movable means for supporting a plurality of receptacles in a row extending in the direction of movement of the supporting means, means for mounting the material-supply device in position at a receptacle-charging station, means for moving said supporting means step by step to carry said receptacles in succession to said station to receive a charge of material from said supply device, a motor for actuating said moving means, means operatively connected to said moving means to predetermine the number of step-by-step movements of said supporting means, timing means including a plurality of switches for controlling the motor circuit whereby to control the operations of said motor to predetermine the duration of rest intervals of said supporting means between the successive step movements thereof, means for interrupting the passage of material to the receptacle, means for actuating said last-mentioned means, a timer motor operable under the control of one of said switches, and switching means operable under the control of said timer motor for controlling the operation of said last-mentioned actuating means and for interrupting the first motor circuit after a predetermined interval of time which is longer than the rest interval determined by said first mentioned timing means in the normal operation thereof.

29. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, time-control means and material-count control means for determining the rest period of said container-supporting means between the intermittent movements thereof, means for selectively placing said motor under the control of either one of said control means whereby said motor is de-energized for a rest period determined by the selected one of said control means, and switching means in circuit with each of said control means, each of said switching means being operable at the termination of each intermittent movement of said container-supporting means for energizing its associated control means to initiate said rest period.

30. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, time-delay timing means and material-count timing means releasably connected together for controlling said motor for determining the rest period of said container-supporting means between the intermittent movements thereof, and means operatively connecting said timing means and said motor for selectively placing said motor under the control of either one of said timing means, whereby said motor is de-energized for a rest period determined by the selected one of said timing means.

31. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, circuit means including time-delay timing means and material-count timing means for determining the rest period of said container-supporting means between the intermittent movements thereof, and means additionally included in said circuit means for selectively placing said motor under the control of either one of said timing means, whereby said motor is de-energized for a rest period determined by the selected one of said timing means.

GEORGE GORHAM.

References Cited in the file of this patent

UNITED STATES PATENTS

| Number | Name | Date |
|---|---|---|
| 1,101,568 | Roberts | June 30, 1914 |
| 2,523,517 | Potter | Sept. 26, 1950 |